United States Patent [19]

Ide

[11] Patent Number: 4,701,084
[45] Date of Patent: Oct. 20, 1987

[54] ATTACHING METHOD FOR SHELL-TYPE MILLING CUTTER

[75] Inventor: Manabu Ide, Fujinomiya, Japan

[73] Assignee: Kabushiki Kaisha Aideie, Shizuoka, Japan

[21] Appl. No.: 903,428

[22] PCT Filed: Dec. 16, 1985

[86] PCT No.: PCT/JP85/00687

§ 371 Date: Aug. 13, 1986

§ 102(e) Date: Aug. 13, 1986

[87] PCT Pub. No.: WO86/04001

PCT Pub. Date: Jul. 17, 1986

[30] Foreign Application Priority Data

Jan. 10, 1985 [JP] Japan ................................. 60-2983

[51] Int. Cl.$^4$ ............................ B23B 1/00; B23C 5/26
[52] U.S. Cl. .................................... 409/131; 279/86;
279/97; 408/239 A; 409/234
[58] Field of Search ....................... 279/86, 89, 90, 91,
279/97; 408/239 R, 239 A; 409/232, 234, 131,
132; 407/40, 41

[56] References Cited

U.S. PATENT DOCUMENTS

| 1,132,375 | 3/1915 | Myers | 279/97 |
|---|---|---|---|
| 1,797,296 | 3/1931 | Ray | 409/234 X |
| 2,789,826 | 4/1957 | Procter | 279/87 |
| 2,912,904 | 11/1959 | Peterson | 409/234 X |
| 2,937,575 | 5/1960 | McCoskey | 409/232 |
| 3,764,224 | 10/1973 | Merz | 408/239 R X |
| 4,378,184 | 3/1983 | Briese | 407/40 X |

FOREIGN PATENT DOCUMENTS 688257  3/1953  United Kingdom .................. 279/87

Primary Examiner—Gil Weidenfeld
Assistant Examiner—Glenn L. Webb
Attorney, Agent, or Firm—Koda and Androlia

[57]  ABSTRACT

The present invention relates to a method for attaching a shell-type milling cutter wherein an area for fastening the shell-type milling cutter to its cutter arbor is increased to raise rigidity and attachment strength thereby making high-speed and heavy-duty cutting possible, so that the cutting efficiency thereof becomes substantially identical to that of an integral structure type milling cutter, besides exchange of the milling cutter can very simply be attained.

The method for attaching a shell-type milling cutter according to the present invention is conducted by such a manner that the inside diameter portion of a shell-type milling cutter is formed into a tapered hole, and a bush is forcibly inserted in a gap defined between the tapered hole and a fitting shaft of a cutter arbor, whereby the milling cutter is fixed to the cutter arbor.

1 Claim, 13 Drawing Figures

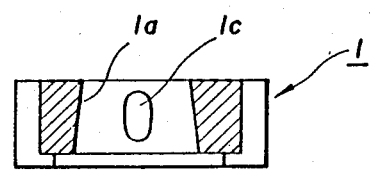
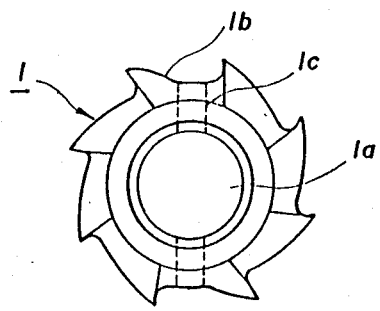
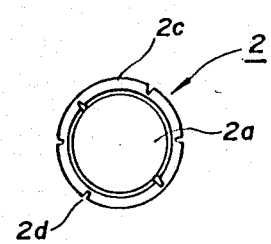
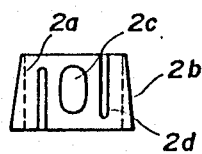
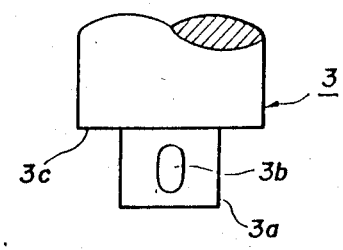
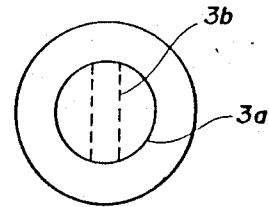

ATTACHING METHOD FOR SHELL-TYPE MILLING CUTTER

TECHNICAL FIELD

This invention relates to a method for attaching a shell-type milling cutter, and particularly to a method for attaching a shell-type milling cutter wherein an area for fastening the shell-type milling cutter to its cutter arbour is increased to raise rigidity and attachment strength thereby making high-speed and heavy-duty cutting possible, so that the cutting efficiency thereof becomes substantially identical to that of an integral structure type milling cutter, besides exchange of the milling cutter can very simply be attained.

BACKGROUND ART

Such an integral structure type milling cutter being integrally composed of a cutting edge portion and a shank is excess of shell-type milling cutter in all the points such as rigidity, machinability, strength, accuracy of finishing, wear proof and the like.

However, when size of a milling cutter itself is large, manufacture of integral structure type milling cutter is restricted, and at the same time the cost therefor is expensive and uneconomical, so that shell-type milling cutter the edge portion of which is exchangeable and which is inexpensive and easily manufactured has mostly been used at the present time.

As a method for attaching such shell-type milling cutter to its cutter arbour, there has heretofore been, as shown in FIG. 7, such a method that a fitting shaft 31a of a cutter arbour 31 is fitted with the inner diameter portion of a milling cutter 11, and further the milling cutter 11 is fixed to the cutter arbour 31 by means of a bolt 5.

In this method, however, when cutting work is conducted, the bolt 5 becomes loose due to vibration derived from cutting, so that degree of fastening of the milling cutter 11 to the cutting arbour 31 becomes poor. In this respect, when rotational frequency or amount of cutting is increased in order to cover such defect as described above, vibration and the like produces this time, and as a result the rotational frequency and the amount of cutting are restricted, so that there is a disadvantage of impeding remarkably improvement of the cutting efficiency.

Furthermore there is also another method for attaching a conventional shell-type milling cutter to a cutter arbour wherein the outer circumference of fitting shaft of a cutter arbour 32 is defined with a left-handed screw thread 32a, whilst the inner diameter portion of a milling cutter 12 is also defined with a left-handed thread 12a as shown in FIG. 8, and the milling cutter 12 is threadedly mounted on the cutter arbour 32. According to this method, when conducted cutting work, the screw is automatically fastened to increase degree of fastening of the milling cutter 12 to the cutter arbour 32, so that high-speed rotation and heavy-duty cutting becomes possible.

In this case, however, the screw is automatically fastened with continuation of cutting work and such cutting resistance resulted therefrom is added as load of threaded portion, so that there are such disadvantages that the threaded portion is completely fastened, in its turn, seizure phenomenon occurs, it makes impossible to separate the milling cutter 12 from the cutter arbour 32, and exchange of the milling cutter becomes impossible.

Accordingly, the present invention has been made to eliminate disadvantages involved in the aforesaid conventional shell-type milling cutters. It is an object of the present invention to provide a method for attaching a shell-type milling cutter wherein an area for fastening the shell-type milling cutter to its cutter arbour is increased to raise rigidity and attachment strength thereby making high-speed and heavy-duty cutting possible, so that the cutting efficiency thereof becomes substantially identical to that of an integral structure type milling cutter, besides exchange of the milling cutter can very simply be attained. The method for attaching a shell-type milling cutter according to the present invention is characterized by fitting loosely the milling cutter through which a tapered hole having somewhat larger diameter than that of a fitting shaft is bored to said fitting shaft of a cutter arbour the extreme end of which is formed into a straight stepped portion, inserting a tapered bush the inside diameter portion of which is extendible in a gap defined between said fitting shaft and said tapered hole, in this situation, inserting a cotter in a cotter hole communicating with the side portions of said fitting shaft, said milling cutter and said bush passing therethrough, and fixing said milling cutter to said fitting shaft in such condition that said bush is forcibly inserted in said gap between the fitting shaft and the tapered hole.

SUMMARY OF THE INVENTION

In the present invention, the inside diameter portion of a shell-type milling cutter is formed into a tapered hole, and a bush is forcibly inserted in a gap defined between said tapered hole and a fitting shaft of a cutter arbour, whereby the milling cutter is fixed to the cutter arbour. As a result, an area for fastening the shell-type milling cutter to its cutter arbour is increased to raise rigidity and attachment strength thereby making high-speed and heavy-duty cutting possible, so that the cutting efficiency thereof becomes substantially identical to that of an integral structure type milling cutter, besides exchange of the milling cutter can very simply be attained.

DESCRIPTION OF THE DRAWINGS

FIG. 1(A) is a sectional view showing a milling cutter for realizing a method for attaching a shell-type milling cutter according to the present invention;

FIG. 1(B) is a bottom view of FIG. 1(A);

FIG. 2(A) is a planar view showing a bush for realizing a method for attaching a shell-type milling cutter according to the present invention;

FIG. 2(B) is a front view of FIG. 2(A);

FIG. 3(A) is a front view showing a cutter arbour for realizing a method for attaching a shell-type milling cutter according to the present invention;

FIG. 3(B) is a front view of FIG. 3(A);

DETAILED DESCRIPTION

The present invention will be described in more detail hereinbelow by referring to the accompanying drawings.

Figure 4A:
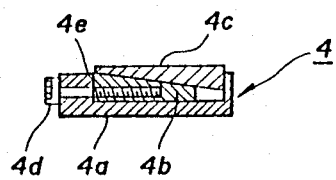
FIG. 4(A) is a sectional view showing a structure of cotter for realizing a method for attaching a shell-type milling cutter according to the present invention.
Figure 4B:
FIG. 4(B) is a front view of FIG. 4(A)

FIGS. 1(A) and 1(B) show an example of milling cutter used in the present invention wherein the inside diameter of a shell-type milling cutter 1 is formed into a tapered hole 1a, and at the same time a cotter hole 1c is bored through a cutter groove 1b. FIGS. 2(A) and 2(B) show an example of a bush used in the present invention wherein the inside diameter portion of the bush 2 is formed into a straight hole 2a, whilst the outside diameter portion thereof is formed into a tapered surface 2b to be in closely contact with the tapered hole 1a of the milling cutter 1. A cotter hole 2c is bored through said tapered surface 2b, and a plurality of split grooves are formed on the side portion of said tapered surface 2b so as to be capable of expansion and contraction. Because of provision of these split grooves 2d, the bush 2 becomes elastic, and the inside diameter portion of the bush is contracted by means of these split grooves 2d, hence this makes a fitting shaft 3a of the undermentioned cutter arbour 3 in closely contact with the bush. When the bush 2 is inserted in the tapered hole 1a of the milling cutter 1, a width of the bush 2 has a dimension such that either it is tightly fitted to the opposite ends of the milling cutter 1, or slightly smaller than the tight fitting, when the bush 2 is inserted in the tapered hole 1a of the milling cutter 1. A position of the cotter hole 2c of the bush 2 deviates somewhat from the cotter hole 1c of the milling cutter 1, and such deviation is utilized for pulling the bush 2 up towards the side of the cutter arbour 3 to tightly fit said bush to the milling cutter 1 in the case when a cotter 4 is fitted into the milling cutter 1, the bush 2, and the cutter arbour. FIGS. 3(A) and 3(B) illustrate an example of the cutter arbour used for the present invention wherein the outside diameter of the fitting shaft 3a of said cutter arbour 3 is such a dimension with which the outside diameter portion is fitted into the straight hole 2a of the bush 2, and a height of the fitting shaft 3a is substantially the same with the whole length of milling cutter or somewhat shorter. Furthermore the cotter hole 3b is bored through a fitting shaft 3a, besides a stepped end surface 3c is formed at a right angle to the fitting shaft 3a. FIGS. 4(A) and 4(B) show an example of the cotter used in the present invention and this height-adjustable cotter 4 comprises a U-shaped main body 4a, a slide member 4b placed on the main body 4a and having a tapered surface, a cover member 4c the top of which is in parallel to the main body 4a when the cover member 4c is superposed on the tapered surface of the slide member 4b, an adjusting screw 4d which run idly with respect to the main body 4a and is threadedly engaged with the slide member 4b, and a washer 4e for preventing slipping out of the adjusting screw 4d. In the above described construction, when the adjusting screw 4d is rotated, the slide member 4b is shifted along the longer direction to move the cover member 4c up and down. The construction of said cotter 4 is substantially the same with that of a leveling block and which is publicly known, so that the details of which will not be described any more. The cotter 4 is not limited to the above described construction, but, for example, an integral wedge may be used.

Figure 5:
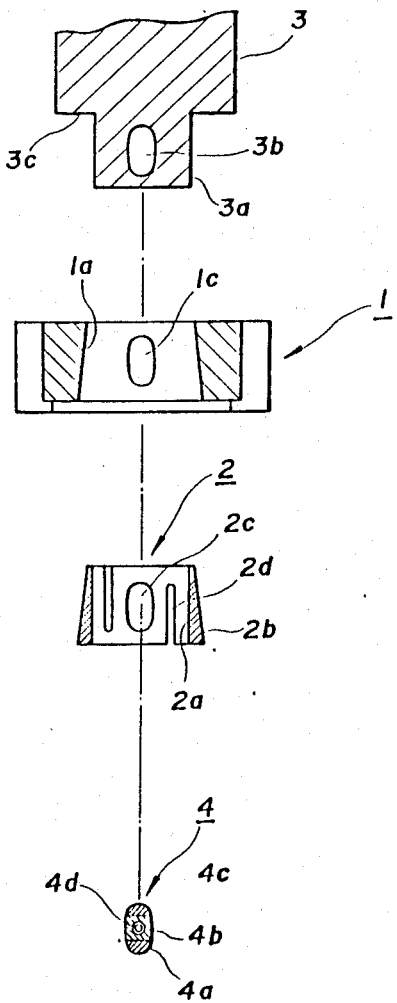
FIG. 5 is an exploded sectional view illustrating a method for attaching a shell-type milling cutter according to the present invention.

In the above construction, the method for attaching a shell-type milling cutter according to the present invention will be described hereinbelow by referring to FIG. 5.

Figure 6A:
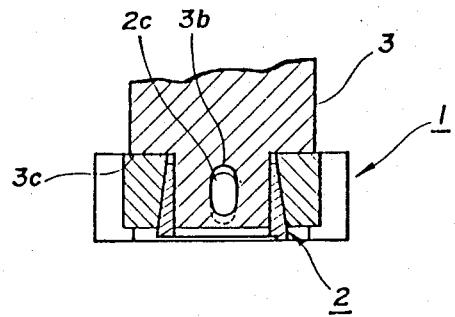
FIGS. 6(A) and 6(B) are sectional views for explaining attached state of a shell-type milling cutter according to the present invention, respectively.

The tapered hole 1a of the milling cutter 1 is loosely fitted to the fitting shaft 3a of the cutter arbour 3, the tapered bush 2 of being capable of expansion and contraction in the inside diameter portion is inserted in a gap defined between the fitting shaft 3a and the tapered hole 1a, and at the same time the cotter 4 is inserted in the cotter holes 1c, 2c, and 3b defined on the side portions of the fitting shaft 3a, the milling cutter 1, and the bush 2, respectively, while maintaining the above described situation, whereby the end surface of the milling cutter 1 is made to be in contact with the stepped end surface 3c of the cutter arbour 3 as shown in FIG. 6(A). In this case, the extreme end of the bush 2 is slightly retreated from the end surface of the milling cutter 1, and the cotter hole 2c deviates somewhat from the cotter hole 1c towards the downwardly expanded side of the tapered hole 1a. A manner for inserting the bush 2 may be such that the bush 2 is first inserted in the tapered hole 1a of the milling cutter 1 while registering the cotter hole 1c with the cotter hole 2c each other, and then the assembled members is fitted to the fitting shaft 3a of the cutter arbour 3.

Figure 6B:
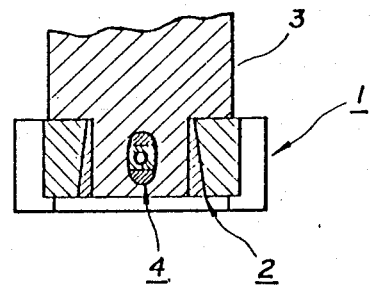
Figure 7:
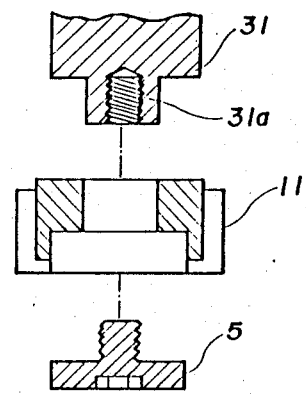
FIG. 7 and FIG. 8 are exploded sectional views each illustrating a conventional method for attaching a shell-type milling cutter.
Figure 8:
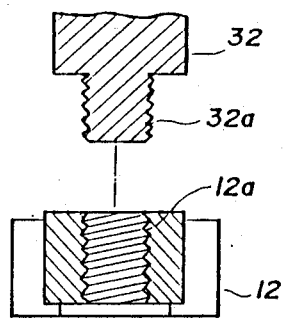

After the insertion, it is confirmed that there is no positional deviation in the circumferential direction of the cotter holes 1c, 2c, and 3b, then the cotter 4 is inserted in the cotter holes 1c, 2c, and 3b, the adjusting screw 4d is rotated to make the cover member 4c in contact with the cotter hole 2c, and the adjusting screw 4d is further rotated to pull up the bush 2 until the cotter holes 1c, 2c, and 3b are aligned with each other, thus the cotter 4 is fitted thereinto so that attachment of the milling cutter 1 is completed as shown in FIG. 6(B). In this case, since the bush 2 is pulled up, the end surface of the milling cutter 1 is tightly fastened with the stepped end surface 3c of the cutter arbour 3 and at the same time, the tapered hole 1a abuts upon the bush 2, whereby the straight hole 2a of the bush 2 is tightly fastened with the fitting shaft 3a, so that the milling cutter 1 is tightly fastened with the cutter arbour 3 by means of two surfaces, i.e., the end surface thereof and the surface of the tapered hole 1a through the bush 2. When the milling cutter 1 is rotated, such force shifting along the downwardly expanded direction of the tapered portion thereof upon the milling cutter 1, this force turns into force for contracting the straight hole 2a of the bush 2, whereby the milling cutter 1 is more firmly fastened tightly to the fitting shaft 3a of the cutter arbour 3.

In case of exchanging the milling cutter 1, the adjusting screw 4d of the cotter 4 is returned to release the cover member 4c from the cotter holes 1c, 2c, and 3b to withdraw the cotter 4, and then the milling cutter may be drawn out from the cutter arbour 3.

INDUSTRIALLY APPLICABLE FIELD

As described above, according to the attaching method for a shell-type milling cutter of the present invention, an area for fastening the shell-type milling cutter to its cutter arbour is increased to raise rigidity and attachment strength thereby making high-speed and heavy-duty cutting possible, so that the cutting efficiency thereof becomes substantially identical to that of an integral structure type milling cutter, besides exchange of the milling cutter can very simply be attained. Accordingly, the method of the present invention is useful in the case where high-speed and heavy-duty milling cutter work is conducted on workpieces, and particularly application of the present method to a milling cutter of a large size is suitable.

I claim:

1. A method of attaching a shell-type milling cutter comprising the steps of:

loosely fitting the milling cutter onto a cutter arbor which has a fitting shaft which is formed with a straight stepped portion at one end by fitting a tapered hole in said milling cutter, which is larger in diameter than said fitting shaft, onto said fitting shaft and engaging with said stepped portion;

inserting a tapered bushing into a gap between said fitting shaft and said tapered hole;

inserting a cotter through a cotter hole extending through said fitting shaft, milling cutter and bushing; and fixing said milling cutter to said shaft by forcing said tapered bushing into said gap.

* * * * *